United States Patent [19]

Schurmann et al.

[11] Patent Number: 4,886,448
[45] Date of Patent: Dec. 12, 1989

[54] SHAFT INSTALLATION FOR PROCESSING OF FUEL-CONTAINING SOLID MATERIALS

[76] Inventors: Peter Schurmann, Lowenweg 12, CH-8157 Dielsdorf, Switzerland; Rudolf Jeschar, Roseneck 1, D-3380 Goslar 1; Volker Frisch, Schillerstrasse 4, D-3360 Osterode am Harz, both of Fed. Rep. of Germany

[21] Appl. No.: 218,125
[22] PCT Filed: Oct. 5, 1987
[86] PCT No.: PCT/CH87/00135
§ 371 Date: Jul. 21, 1988
§ 102(e) Date: Jul. 21, 1988
[87] PCT Pub. No.: WO88/02465
PCT Pub. Date: Apr. 7, 1988

[30] Foreign Application Priority Data

Oct. 6, 1986 [CH] Switzerland ............... 39801/86

[51] Int. Cl.⁴ .............................................. F27B 15/00
[52] U.S. Cl. .................................... 432/99; 432/14; 432/101
[58] Field of Search ................ 432/95, 96, 99, 98, 432/101

[56] References Cited

U.S. PATENT DOCUMENTS

| | | | |
|---|---|---|---|
| 3,074,706 | 1/1963 | Schmid et al. | 432/99 |
| 3,142,480 | 7/1964 | Azbe | 432/99 |
| 3,392,969 | 7/1968 | Muller | 432/99 |
| 3,958,919 | 5/1976 | Kjell-Berger | 432/99 |
| 4,008,994 | 2/1977 | Numasaki et al. | 432/99 |
| 4,473,352 | 9/1984 | Sonoda et al. | 432/101 |
| 4,635,573 | 1/1987 | Santen | 110/244 |
| 4,747,773 | 5/1988 | Predescu et al. | 432/96 |

Primary Examiner—Henry C. Yuen
Attorney, Agent, or Firm—Cushman, Darby & Cushman

[57] ABSTRACT

A shaft kiln installation is used to burn pellets of solid materials containing volatile and/or solid fuels, and at the same time to calcinate minerals. For this purpose, the installation uses in the heating, degassing (1,04) and combustion zones (1,06) a co-current flow of combustion gas. The installation has at least one first upper section (1,04;1,06) for carrying out the above-mentioned process steps. If necessary, a third counter-current cooling section (1,10) for the combustion material and a second, middle section (1,08) that acts as a neutral zone, may be added. The heat content of the combustion gas and cooling air may be used for heating the combustion air.

5 Claims, 2 Drawing Sheets

SHAFT INSTALLATION FOR PROCESSING OF FUEL-CONTAINING SOLID MATERIALS

The invention relates to a shaft installation, in particular to a shaft kiln, for processing of fuel-containing pieces of solid material by means of burning the same with air or oxygen-containing gas and/or for the thermal treatment of mineral raw materials by means of burning pieces of fuel containing volatile components, with charging and removal devices.

The invention also relates to a method for the processing of fuel-containing pieces of solid materials in such a shaft installation.

A number of installations have been proposed for the processing of fuel-containing pieces of solid materials and/or for the thermal treatment of mineral raw materials by means of burning of pieces of fuel containing volatile components: tunnel furnaces, ring shaft kilns or installations, parallel-flow shaft kilns and co-current shaft kilns.

In the tunnel furnace the material to be treated is transported on cars through the furnace and is heated in the counter current. Because such raw material is always very heterogenous in its composition and the size distribution of its grains, the optimal treatment temperature for the individual pieces of the raw material varies. Because of this and depending on the composition of the material, insufficient or excessive combustion occurs which, in turn, can lead to caking of the material. However, this does not pose a problem in a tunnel furnace because the material is at rest and possible caking can therefore be broken up after passing through the furnace. But a considerable increase in cost is required because of this. However, the important disadvantage in the use of the tunnel furnace is that no flow through the material itself takes place. Therefore the time for the gas extraction or gasification of the fuel bound in the material is very long and investment costs are correspondingly high.

For an economical solution, i.e. high daily tonnage output in which flow-through of the material takes place, it is required that a reactor do not have any internal components.

These prerequisites are also fulfilled by a ring shaft installation with a plurality of kilns disposed in series, which operates on the kiln principle, which has proven itself in connection with such treatment. The ring conduits required for such a ring kiln process must be provided altogether five times, namely for the pre-heated air, the cold air, the waste gas, the ignition air and the pre-heat exhaust air. The corresponding difficulties and operational uncertainties are obvious. The individual kilns are filled with or emptied of solid material by steps.

In DE-A1 3 310 495, a parallel-flow shaft kiln for the processing or treatment of such solid materials is described and claimed. Reference is made here also to the publications in GLUECKAUF 118, No. 21, p. 1098A, cited in this patent application.

The installation in accordance with the cited German laid-open patent application is used for the extraction of building materials or of aggregates for the same from hard coal dressing wastes. For this purpose these are separated by grain size, dried and preheated in a first process step, heated and brought to reaction in a second process step and maintained at a set temperature in a third process step. The installation comprises chambers disposed concentrically to each other, a drying and preheating chamber being surrounded by a heating and reaction chamber. Below the heating and reaction chamber is located a loitering chamber from which the treated material reaches the outlet chamber of a kiln which also surrounds the loitering chamber. The gases freed during the heating and reaction of the treated material are routed to a combustion chamber disposed in a conical clearance surrounded by the kiln.

DE-A1 3 509 275 describes and claims a method for the thermal treatment of coal dressing wastes in at least two separate treatment steps, the wastes being dried in a first step and heated in a second step and subsequently cooled in a cooling step. The tailings are dried under constant agitation directly in the counter current by air indirectly heated in the cooling step or by other heated carrier gases and are preheated to a temperature of the solid material of up to 200° C. and are then heated directly and/or indirectly to a final temperature of between 750° to 950° C. in the steps following the drying step. The heating gases consist of extraction gases partially circulated and of combustion gases.

Finally, the object of EP-A1 0 059 542 relates to a shaft combustion installation for the calcination of minerals and/or the burning of solid fuels, if need be waste materials. Among others, cooling air directly from the lower part of the furnace is always used, this air being introduced into the furnace under pressure and through complex distribution installations.

In contrast thereto this invention relates to a single shaft kiln through which solid material as well as air or gas are continuously fed, namely in the preheating, gas extraction and combustion zones essential for the treatment or processing of the material, in co-current and, if need be only in the cooling zone in counter current. The neutral zone provided therebetween is used, among others, for the thermal treatment of the material. By means of these novel arrangements in the total installation, i.e. by means of this novel execution of the process, an optimal matching of the kinetics of the reactions taking place in the shaft kiln with the corresponding thermodynamic balances is achieved: because of the heat recuperation in the cooling zone the energy balance of the installation is favorable. Above all, however, it is attained that all volatile combustible components are surely routed to the combustion zone and burned there with few pollutants.

In particular the shaft installation in accordance with the invention permits the use of only the heat contents of the combustion and cooling air in the air utilized. This is the most important prerequisite for a combined utilization for calcination and for the combustion of waste materials. Also, slight underpressure can be used at the shaft kiln inlet, in the solid material feed area as well as in the air supply, which considerably simplifies the construction of the installation. For the reasons cited, air distribution at the inlet poses no particular problems.

Also, the shaft installation in accordance with the invention is suitable for the use of naturally occuring or processed or prepared waste materials of every kind.

In U.S. patent application Ser. No. 023 800 a group of such solid fuels made of processed waste materials is described; the fuels in the form of briquets have a fuel component, a neutralizing component and a waste material component. The latter can be a liquid. Preferred fuel compositions are those which have a total of no more than 40% by weight of liquid and a gross calorific value of at least 450 kJ/kg. These fuel briquets are formed under pressure and are burned at temperatures above 1,150° C.

The shaft installation in accordance with the invention for the processing of fuel-containing pieces of solid material by means of burning the same with air or oxygen-containing gas and/or for the thermal treatment of mineral raw materials by means of burning pieces of fuel containing volatile components, with chargng and removal devices, is characterized by a first upper shaft segment for preheating, gas extraction and combustion zones with the combustion air inlet, in the direction of flow, upstream of the preheating zone and the waste air outlet downstream of the combustion zone so that in this segment the solid material and the gas are routed co-currently, by either a hot discharge with a separate component for the subsequent cooling of the material or by a third lower shaft segment for the cooling zone with the cooling air supply behind and the cooling air exhaust ahead of the cooling zone so that in this segment the solid material and the gas are routed counter-currently and a second, middle segment for a neutral zone with the waste gas exhaust ahead of and the cooling air exhaust behind the neutral zone.

If required, the recited shaft installation has devices for the indirect use of the heated cooling air; also, devices for the exhaust of the waste gases at the end of the combustion zone and for the routing of these combustion gases to a heat exchanger and/or a waste gas scrubber may be provided.

Temperature and pressure measuring instruments are advantageously disposed in the waste gas and cooling air exhausts for monitoring the process.

If required, internal components, for example guide panels, may be provided in the shaft installation recited above; they are used for conducting the heat from the combustion zone to the preheating zone.

The method in accordance with the invention is used for the processing of fuel-containing pieces of solid material by means of burning the same with air or oxygen-containing gas in a shaft installation and is characterized by method steps in the following order:

Heating, gas extraction and burning of the solid fuel in a co-current with air or oxygen-containing gas for reaching a preselected temperature, by maintaining the material to burned at the said temperature and by cooling the material to be burned by air or oxygen-containing gas in counter current, control of the process taking place by means of the temperature of the combustion air or by means of the addition of inert materials to the material fed in.

Among others, the shaft installation is used for processing of coal dressing wastes. However, other specific uses are conceivable in the spirit of the method according to the invention.

The installation in accordance with the invention will now be described by means of an exemplary embodiment. The attached FIGS. 1 and 2 are used for this. This description also includes the method according to the invention.

The installation shown is the shaft kiln having all three segments.

FIG. 1 shows the shaft kiln per se; in it the reference numerals mean

| 1.01 | charging silo, |
|------|----------------|
| 1.02 | double lock mouth, |
| 1.03 | combustion air inlet, |
| 1.04 | preheating zone, |
| 1.05 | combustion front, |
| 1.06 | combustion zone, |
| 1.07 | waste gas exhaust, |
| 1.08 | neutral zone, |
| 1.09 | cooling air exhaust, |
| 1.10 | cooling zone, |
| 1.11 | discharge plate, |
| 1.12 | cooling air inlet, and |
| 1.13 | double lock discharge. |

Figure 1:
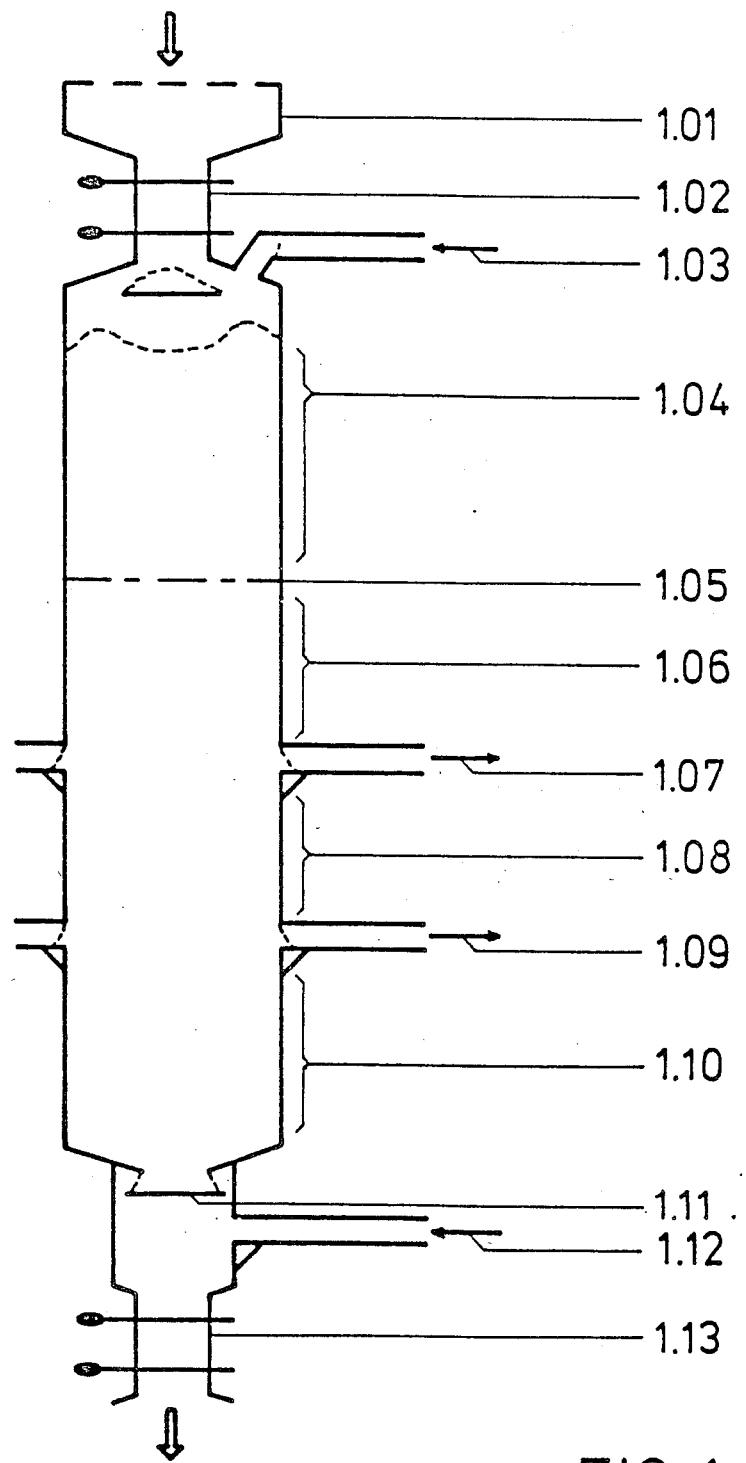
FIGS. 1 and 2 show the installation according to the invention purely schematically.
Figure 2:
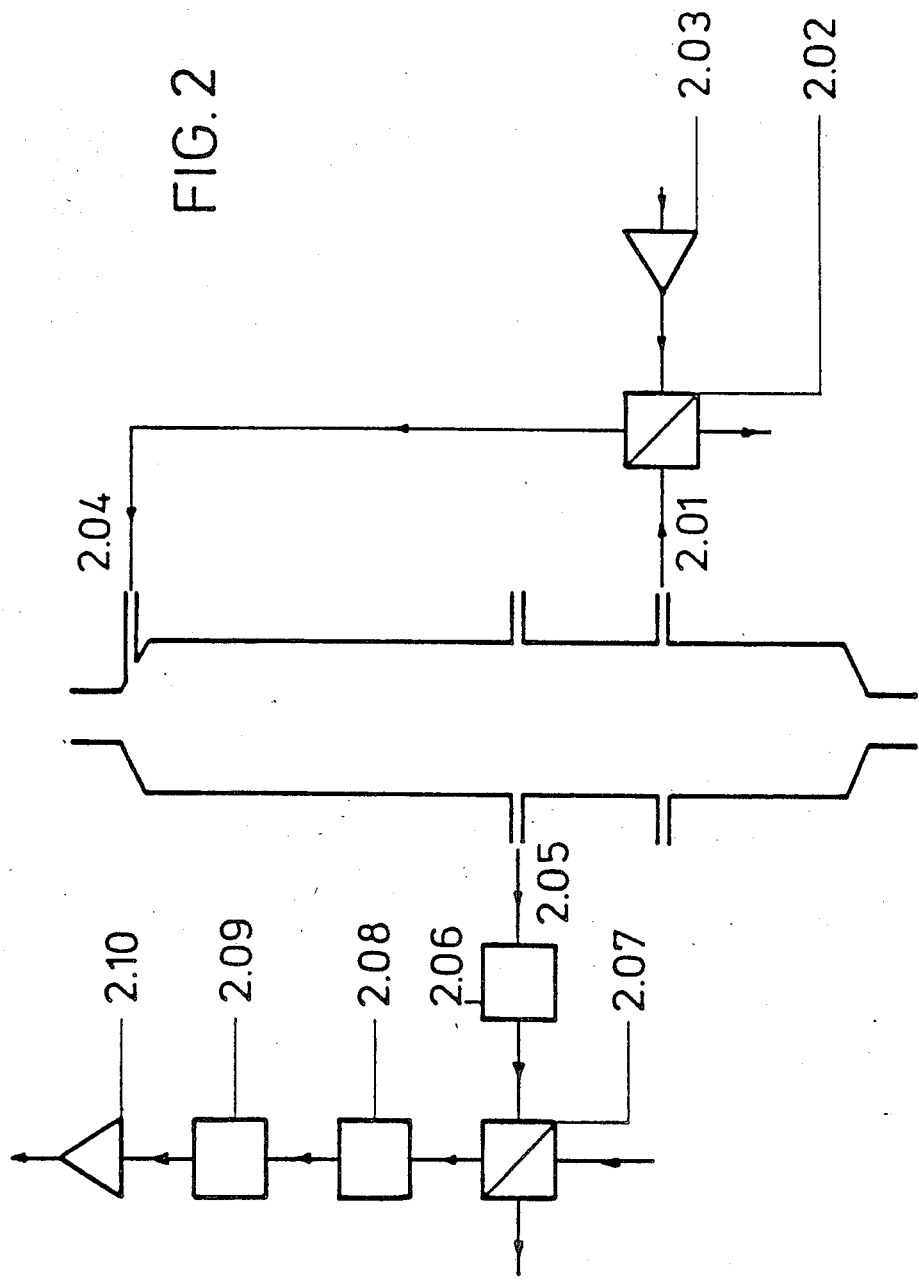

FIG. 2 is a preferred embodiment of the total shaft installation, in it the reference numerals mean

| 2.01 | cooling air exhaust, |
|------|----------------------|
| 2.02 | cooling air heat exchanger, |
| 2.03 | conveyor blower, |
| 2.04 | combustion air inlet, |
| 2.05 | combustion gas exhaust, |
| 2.06 | $SO_2$ filter, |
| 2.07 | waste gas heat exchanger, |
| 2.08 | HF-filter, |
| 2.09 | dust and droplet filter and |
| 2.10 | exhaust fan. |

DECLARATION CITED IN ARTICLE 19

The present patent application is limited to the embodiment in accordance with original FIG. 2, used for the processing of waste fuel and for the thermal treatment of mineral raw materials.

In connection with this, in the national phases the teachings of the two publications relevant to the invention according to the International Search Report and their combination will be extensively cited and the abstract will be changed accordingly.

The object of EP-A1 0 059 542 relates to a shaft combustion installation for the calcination of minerals and/or the burning of solid fuels, if need be waste materials. Among others, cooling air directly from the lower part of the furnace is always used, this air being introduced into the furnace under pressure and through complex distribution installations. Such cooling air, however, is never completely free of harmful combustion products, because the material to be burned is still at its highest temperature at the beginning of the cooling segment and there comes into contact with the hot cooling air. In the process harmful volatile combustion products are discharged into the air.

Since these harmful substances are circulated in the installation in accordance with EP-A1 0 059 542, the system automatically attains a higher level of harmful substances which is not acceptable during calcination of most mineral materials.

The installation in accordance with the cited EP-A2- 0 120 486 is used for obtaining building materials or of aggregates for the same from hard coal dressing wastes. For this purpose these are separated from grain size, dried and preheated in a first process step, heated and brought to reaction in a second process step and maintained at a set temperature in a third process step. The installation comprises chambers disposed concentrically to each other and having diameters variable in height, a drying and preheating chamber being surrounded by a heating and reaction chamber. Below the heating and reaction chamber is located a loitering chamber from which the treated material reaches the outlet chamber of a kiln which also surrounds the loitering chamber.

The gasses freed during the heating and reaction of the treated material are routed to a combustion chamber disposed in a conical clearance surrounded by the kiln. Subsequently the combustion gases can come into direct contact with the material to be burned.

Neither the method nor the device in accordance with EP-A-2-0 120 486 are described as at all suitable for calcination of minerals—in particular not if waste fuel materials are used. Neither does a combination of the teachings of the two EP references just discussed lead to the solution in accordance with the invention. The object of the invention alone—a method as well as an installation for the utilization of low-grade fuels, including waste fuel materials, as well as the low-contamination calcination of minerals with use of the cited fuels—and even more so the attainment of this object according to the invention with the method and the shaft kiln installation in which the cooling air is used only for the heating of combustion air and the combustion gases are used after heat exchange and expensive scrubbing—only for fuel utilization!—, cannot be found in the combined teachings cited.

What is claimed is:

1. A shaft installation having a vertical shaft having a plurality of sections in series including a preheating section, a combustion section, a neutral section, and a cooling section comprising:
   (a) a charging means at the top of said furnace through which solid materials containing volatile components used as fuel are fed in a downward direction;
   (b) gas inlet means near the top of said furnace for introducing combustion gas which flows downwardly and cocurrently with the solid materials in an upper preheating section where the solid material is partially combusted and then through the combustion section where the solid material is completely combusted;
   (c) gas outlet means at the lower end of the combustion section for removing product gases formed in the preheating and combustion sections from the furnace,
   (d) a neutral section of said furnace wherein the combusted solids flow downwardly into the top of the cooling section;
   (e) second gas outlet means at the top of said cooling section for removing cooling gases from the cooling section and the furnace;
   (f) a cooling section where the downwardly moving solids flow counter-current to upwardly flowing cooling gas introduced into the furnace through second gas inlet means at the bottom of the cooling section and the furnace.

2. A shaft installation in accordance with claim 1, which further comprises a heat exchange means where the heated cooling gas removed from the second gas outlet of the furnace is passed in heat exchange relationship with the combustion gas being introduced into the furnace through the first gas inlet means.

3. A shaft installation in accordance with claim 1 or 2, which further comprises devices which connect said waste gases removed from the furnace through the first gas outlet means to a heat exchanger installation, a waste gas scrubbing installation or both.

4. A shaft installation in accordance with claim 1, which further comprises temperature and pressure measuring devices disposed in the waste gas and cooling air exhausts removed from the first and second gas outlet means, respectively.

5. A method for the processing of solid materials containing volatile components as a fuel in which the material is fed into the top of the shaft furnace through a feeder and descends by gravity through a plurality of zones in series including an upper pre-heating zone, a combustion zone, a neutral or quiescent zone, and a cooling zone comprising the steps of:
   (a) feeding the material concurrently with a combustion gas comprising air or an oxygen-containing gas introduced at the top of said furnace to pre-heat the material and partially combust said feed material to product gas,
   (b) passing downwardly and concurrently said feed material, said combustion gas, and said product gas into said combustion zone and therein heating the partially combusted material obtained in step (a) to dry and vaporize said solid material and a produce additional combustion product gases,
   (c) removing said product gases formed in step (a) and (b) from the shaft furnace near the bottom of said combustion zone for further recovery,
   (d) flowing the solid material freed of product gases in step (c) through said neutral zone,
   (e) allowing said solid material from step (d) to move downwardly through a cooling zone countercurrent to a cooling gas introduced at a lower end of said shaft furnace and removed from the furnace between the bottom of the neutral zone and top of the cooling zone, and
   (f) removing cooled residual solid material from the bottom of the furnace.

* * * * *